US010433251B2

United States Patent
Kneckt et al.

(10) Patent No.: US 10,433,251 B2
(45) Date of Patent: Oct. 1, 2019

(54) POWER SAVING IN WLAN STATIONS USING DATA ACCUMULATION AT AN ACCESS POINT

(71) Applicant: Nokia Technologies Oy, Espoo (FI)

(72) Inventors: Jarkko Kneckt, Espoo (FI); Olli Alanen, Vantaa (FI); Timo Nihtila, Jyväskylä (FI); Mika Kasslin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 416 days.

(21) Appl. No.: 14/650,914

(22) PCT Filed: Dec. 19, 2012

(86) PCT No.: PCT/FI2012/051267
§ 371 (c)(1),
(2) Date: Jun. 10, 2015

(87) PCT Pub. No.: WO2014/096504
PCT Pub. Date: Jun. 26, 2014

(65) Prior Publication Data
US 2015/0319693 A1 Nov. 5, 2015

(51) Int. Cl.
*H04W 52/02* (2009.01)
*H04W 28/18* (2009.01)
(Continued)

(52) U.S. Cl.
CPC ... *H04W 52/0219* (2013.01); *H04W 28/0205* (2013.01); *H04W 28/18* (2013.01); *H04W 48/12* (2013.01); *H04W 52/0209* (2013.01); *H04L 67/325* (2013.01); *H04W 72/12* (2013.01); *H04W 84/12* (2013.01); *H04W 88/02* (2013.01); *H04W 88/12* (2013.01); *H04W 88/181* (2013.01); *Y02D 70/142* (2018.01)

(58) Field of Classification Search
None
See application file for complete search history.

(56) References Cited

U.S. PATENT DOCUMENTS

| 7,668,128 | B1* | 2/2010 | Benveniste | H04W 28/18 370/252 |
| 2005/0237984 | A1* | 10/2005 | Benveniste | H04W 72/1242 370/338 |

(Continued)

OTHER PUBLICATIONS

International Search Report of PCT/FI2012/051267 dated Sep. 26, 2013.

*Primary Examiner* — Yemane Mesfin
*Assistant Examiner* — Jeff Banthrongsack
(74) *Attorney, Agent, or Firm* — Harrington & Smith

(57) ABSTRACT

There is provided, for example, a method, comprising: transmitting, by a wireless device, a data accumulation request to an access node of a wireless network, wherein the data accumulation request comprises at least one downlink accumulation rule for accumulating downlink data; receiving a message from the access node, wherein the message indicates that there is downlink data in the access node for the wireless device; and triggering a service period for receiving the downlink data from the access node upon determining, on the basis of the received message, that the downlink data satisfies the at least one downlink accumulation rule.

16 Claims, 5 Drawing Sheets

---

200 TRANSMITTING A DATA ACCUMULATION REQUEST TO AN ACCESS NODE OF A WIRELESS NETWORK, WHEREIN THE DATA ACCUMULATION REQUEST COMPRISES AT LEAST ONE DOWNLINK ACCUMULATION RULE FOR ACCUMULATING DOWNLINK DATA

↓

202 RECEIVING A MESSAGE FROM THE ACCESS NODE, WHEREIN THE MESSAGE INDICATES THAT THERE IS DOWNLINK DATA IN THE ACCESS NODE FOR THE WIRELESS DEVICE

↓

204 TRIGGERING A SERVICE PERIOD FOR RECEIVING THE DOWNLINK DATA FROM THE ACCESS NODE UPON DETERMINING, ON THE BASIS OF THE RECEIVED MESSAGE, THAT THE DOWNLINK DATA SATISFIES THE AT LEAST ONE DOWNLINK ACCUMULATION RULE

(51) Int. Cl.
*H04W 48/12* (2009.01)
*H04W 28/02* (2009.01)
*H04W 84/12* (2009.01)
*H04W 88/02* (2009.01)
*H04W 88/12* (2009.01)
*H04W 88/18* (2009.01)
*H04W 72/12* (2009.01)
*H04L 29/08* (2006.01)

(56) References Cited

U.S. PATENT DOCUMENTS

2005/0249227 A1 11/2005 Wang et al.
2007/0097933 A1* 5/2007 Kuc ................. H04W 52/0219
370/338

* cited by examiner

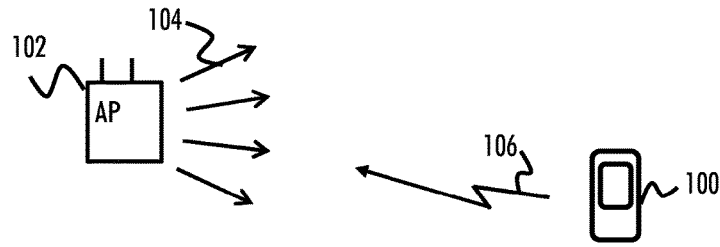

FIG. 1

```
200 TRANSMITTING A DATA ACCUMULATION REQUEST TO AN ACCESS NODE OF A WIRELESS
NETWORK, WHEREIN THE DATA ACCUMULATION REQUEST COMPRISES AT LEAST ONE DOWNLINK
ACCUMULATION RULE FOR ACCUMULATING DOWNLINK DATA
```

```
202 RECEIVING A MESSAGE FROM THE ACCESS NODE, WHEREIN THE MESSAGE INDICATES THAT
THERE IS DOWNLINK DATA IN THE ACCESS NODE FOR THE WIRELESS DEVICE
```

```
204 TRIGGERING A SERVICE PERIOD FOR RECEIVING THE DOWNLINK DATA FROM
THE ACCESS NODE UPON DETERMINING, ON THE BASIS OF THE RECEIVED MESSAGE,
THAT THE DOWNLINK DATA SATISFIES THE AT LEAST ONE DOWNLINK ACCUMULATION RULE
```

FIG. 2

STEP 200

```
201 RECEIVING A DATA ACCUMULATION RESPONSE FROM THE ACCESS NODE, WHEREIN THE RESPONSE
INDICATES WHETHER OR NOT THE ACCESS NODE ACCEPTS THE ACCUMULATION REQUEST
```

FIG. 3

STEP 204

```
205 RECEIVING AT LEAST PART OF THE DOWNLINK DATA SATISFYING THE AT LEAST ONE DOWNLINK
ACCUMULATION RULE FROM THE ACCESS NODE DURING THE TRIGGERED SERVICE PERIOD
```

FIG. 5

| ID | LENGTH | ACCUMULATION RULES FOR AC #0 | ACCUMULATION RULES FOR AC #1 | ACCUMULATION RULES FOR AC #2 | ACCUMULATION RULES FOR AC #3 |
|---|---|---|---|---|---|
| 1 | 1 | 3 | 3 | 3 | 3 |

| MTU: MINIMUM TRANSMISSION UNIT | AT: ACCUMULATION TIME | ACCUMULATION APPLICABILITY |
|---|---|---|

| APPLIED TO TIM | APPLIED TO MORE DATA | APPLIED TO DATA TX | APPLIED TO EOSP | MAX SIZE OF EXCLUDED PACKETS |
|---|---|---|---|---|
| 1 | 1 | 1 | 1 | 4 |

1100 TRANSMITTING A DATA ACCUMULATION REQUEST TO THE ACCESS NODE, WHEREIN THE DATA ACCUMULATION REQUEST COMPRISES MULTIPLE SETS OF AT LEAST ONE DOWNLINK ACCUMULATION RULE, WHEREIN EACH SET CORRESPONDS TO A SPECIFIC LEVEL OF DOWNLINK ACCUMULATION RULES

1102 RECEIVING AN INDICATION FROM THE ACCESS NODE, WHEREIN THE INDICATION INDICATES THE LEVELS FOR WHICH THE CORRESPONDING SET OF AT LEAST ONE DOWNLINK ACCUMULATION RULE IS MET BY THE DOWNLINK DATA IN THE ACCESS NODE

FIG. 11

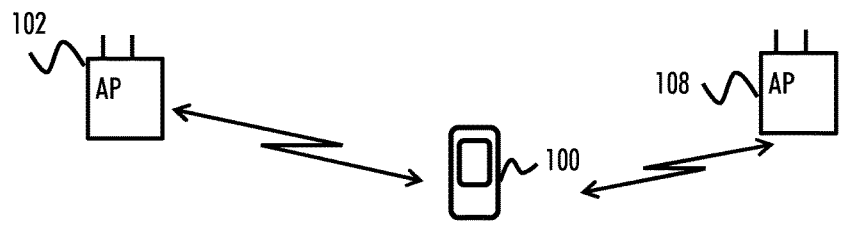

FIG. 12A

1200 RECEIVING MESSAGES FROM MULTIPLE ACCESS NODES, WHEREIN EACH MESSAGE INDICATES WHETHER THE DOWNLINK DATA IN THE CORRESPONDING ACCESS NODE FOR THE WIRELESS DEVICE SATISFIES THE AT LEAST ONE DOWNLINK ACCUMULATION RULE

1202 SELECTING A COMMUNICATION LINK TO BE TRIGGERED AMONG THE MULTIPLE COMMUNICATION LINKS TO MULTIPLE ACCESS NODES ON THE BASIS OF THE RECEIVED MESSAGES

FIG. 12B

POWER SAVING IN WLAN STATIONS USING DATA ACCUMULATION AT AN ACCESS POINT

FIELD

The invention relates generally to wireless networks More particularly, the invention relates to power saving of the wireless network devices.

BACKGROUND

It may be advantageous to apply some sort of power saving techniques in user terminals communicating under a wireless network.

BRIEF DESCRIPTION OF THE INVENTION

According to an aspect of the invention, there are provided methods as specified in claims 1 and 17.

According to an aspect of the invention, there are provided apparatuses as specified in claims 21, 37 and 41.

According to an aspect of the invention, there is provided a computer program product as specified in claim 42.

According to an aspect of the invention, there is provided a computer-readable distribution medium carrying the above-mentioned computer program product.

According to an aspect of the invention, there is provided an apparatus comprising processing means configured to cause the apparatus to perform any of the embodiments as described in the appended claims.

According to an aspect of the invention, there is provided an apparatus comprising a processing system configured to cause the apparatus to perform any of the embodiments as described in the appended claims.

According to an aspect of the invention, there is provided an apparatus comprising means for performing any of the embodiments as described in the appended claims.

Embodiments of the invention are defined in the dependent claims.

LIST OF DRAWINGS

In the following, the invention will be described in greater detail with reference to the embodiments and the accompanying drawings, in which FIG. 1 presents a communication scenario in which some of the embodiments are applicable to;

FIGS. 2, 3, 4, and 5 show methods, according to some embodiments;

FIGS. 6, 7, and 8 show communication frames, according to some embodiments;

FIGS. 11, 12B and 13 illustrate methods, according to some embodiments;

FIG. 12A shows a communication scenario in which some of the embodiments are applicable to.

DESCRIPTION OF EMBODIMENTS

Figures 4, 6, 7, 8:
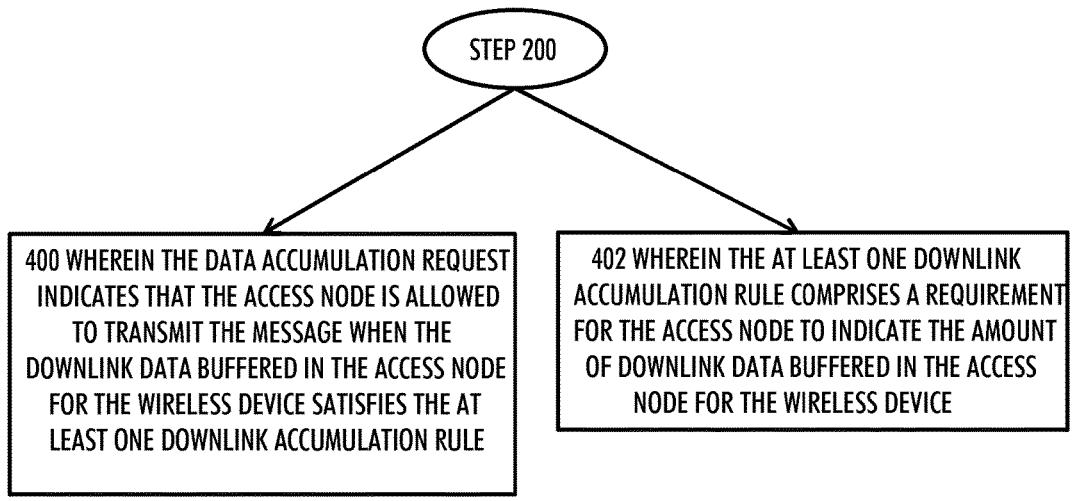

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Power saving may be of importance for the devices operating under a wireless network. The wireless network may be a short range wireless network, e.g. wireless local area network (WLAN). Let us in the following focus on the WLAN as the wireless network to which embodiments of the invention are applicable to. The IEEE 802.11 is a set of standards for implementing such WLAN, also known as the Wi-Fi. The number of IEEE 802.11-enabled mobile devices is ever increasing. IEEE 802.11 devices, at least for a WLAN station (STA) not acting as an access point/node (AP). For example, unscheduled automatic power save delivery (UAPSD) is a WLAN power save principle that may be used for individually addressed frames. Such STA not working as an AP may freely select the time when it tries to transmit a frame which triggers an UAPSD service period (SP). After receiving the trigger frame, the AP transmits the traffic buffered for the STA and upon transmitting the last buffered frame for the STA, the AP may set the End Of Service Period (EOSP) bit to 1. This bit indicates to the STA that there is no more data buffered for it in the AP and the STA may therefore go back to sleep provided that it does not have data to be sent in uplink direction.

WLAN transmission efficiency may depend on the success rate of the transmissions and the duration that the transmitter needs to maintain the transmitter on to transmit the data. If the transmitter transmits very short frames, a lot of overhead is created by transmitting the medium access control (MAC) headers, acknowledgements (ACKSs) and obtaining the transmission opportunities (TXOPs). Further, multi-path techniques may be applied for offloading the traffic, i.e. capability to use the local area networks to transmit traffic has been one of the main research questions in the radio communications. The target may be to optimize the performance of the radio systems and to obtain good user experience. However, depending on the application/data transmission mode, the traffic may be generated with very different periodicity.

Looking at FIG. 1, when a device (STA) 100 operates in power save, it should reduce the number of individual service periods and transmit relevant data amounts during them in order to save power. Similarly if a transmitter transmits small frames very frequently, it easily consumes a lot of transmission resources. An AP 102 should therefore have means to reduce the traffic load. However, typically when the STA 100 operates in power save, it listens to beacons 104. When the STA notices from a traffic indication map (TIM) information element (sent periodically from the AP 102 to the STA 100 in the beacon 104, for example) that there is buffered data for it in the AP 102, the STA may not know whether there is only a small amount of data buffered for it. Thus, the STA 100 may send triggering frames 106 for triggering service periods too often. This may lead the service periods being short and thus creating lots of overhead and also lowering the power saving possibilities of the STA 100.

Therefore, accumulation rules, comprising, e.g., a minimum transmission unit (MTU) and/or accumulation time (AT), are proposed to be used in data communication. The accumulation rules may be used for enlarging the size of the transmitted data and, thus, improving the air interface efficiency. For example, as will be explained, a WLAN STA 100 may use the accumulation rules to control the service period initiation. For instance, when the STA 100 gets UL traffic to be transmitted, the terminal (=STA) 100 first accumulates data according to the accumulation rules before the trigger frame is transmitted. Similarly, downlink data may need to fulfill a certain accumulation rule before buffered downlink data is indicated by the AP 102 in the TIM element to the STA 100. Such the service period initiation logic may increase throughputs and lower the power consumption. Further, the accumulation rules applied to the service period initiation may enable the devices 100/102 to transmit larger aggregates and to operate shorter time in an awake-state.

As shown in FIG. 2, it is proposed that the wireless device 100, in step 200, transmits a data accumulation request to the access point/node (AP) 102 of the wireless network. The wireless device 100 may be also called wireless user equipment (UE), a wireless user terminal (UT) or a wireless station (STA), for example. For the sake of simplicity of the description, let us denote the wireless device 100 as a UE 100. The data accumulation request comprises at least one downlink (DL) accumulation rule for accumulating DL data. Therefore, the UE 100 may decide whether or not the power safe technique utilizing the accumulation rules is to be applied or not with the UE 100. By the AP 102 receiving the accumulation request, the AP 102 acquires knowledge of the at least one accumulation rule to be applied in the transmission of downlink data to the specific user terminal 100. In this way, the UE 100 indicates, in the request, the accumulation criteria/rules for the AP 102 and how the AP 102 is to apply the indicated accumulation rules in power save and data transmissions to the terminal 100. Let us consider the types of the accumulation rules later.

As shown in FIG. 3, in an embodiment, the AP 102 may respond in step 201 by transmitting a data accumulation response to the UE 100, wherein the response indicates whether or not the AP 102 accepts the accumulation request. It may be that the AP 102 does not accept the data accumulation request for some reason. One reason may be a low traffic load in which case the data accumulation may not provide any significant benefit as the service periods are already triggered with low frequency. Let us assume in this case that the AP 102 accepts the accumulation request, i.e. that the response indicates the success of setting the accumulation rule into use by the AP 102. As one possible option, the AP 102 may accept the indicted accumulation rule(s) with modifications. In such case, the AP 102 may indicate in the response how the accumulation rule(s) is/are modified before taking into use by the AP 102.

In this manner each UE, such as the UE 100, may be responsible of determining the accumulation parameters/rules and of deciding when to apply the power saving with respect to the connection between the corresponding UE and an associated AP 102. For example, the UE 100 may affect how the AP 102 aggregates the DL data for transmission. The negotiation between the UE 100 and the AP 102 may allow both of them to know which rules to apply and how. Further, the UE 100 being responsible of the accumulation parameters may allow the UE 100 to control the applied accumulation parameters, which may avoid unnecessary data transmissions. This may further lower the power consumption of the device 100. For example, the data accumulation parameters for terminals having delay sensitive traffic may be adjusted to keep data delays acceptable.

In step 202 of FIG. 2, the AP 102 may transmit, and the UE 100 may receive, a message (e.g. a DL data indication) indicating that there is DL data in the AP 102 for the UE 100. In an embodiment, the message is comprised in the beacon of the AP 102. In one embodiment, the message is a dedicated message to the UE 100. In an embodiment, the message comprises a traffic indication map (TIM). In an embodiment, the message is transmitted only when the DL data buffered in the AP 102 satisfies the at least one accumulation rule. In an embodiment, the message indicates the exact amount of data buffered in the AP 102 for the UE 100 in the TIM.

In step 204 of FIG. 2, the UE 100 may then trigger a service period (SP) for receiving the DL data from the AP 102 upon determining, on the basis of the received message, that the DL data satisfies the at least one DL accumulation rule. In an embodiment, as shown in block 400 of FIG. 4, that the AP 102 is instructed by the accumulation request not to indicate the presence of DL data to the UE 100 unless the buffered DL data for the UE 100 satisfies the indicated at least one accumulation rule. In this case, the reception of the message in step 202 may allow the UE 100 to determine that the downlink data buffered in the access node fulfills the at least one downlink accumulation rule. Alternatively or in addition to, in an embodiment as shown in block 402 of FIG. 4, the at least one DL accumulation rule comprises a requirement for the AP 102 to indicate the amount of DL data buffered in the AP 102 for the UE 100. In this case the message received in step 202 may indicate the amount of DL data buffered in the AP 102 for the UE 100. Thus, the received message may allow the UE 100 to determine the amount of DL data buffered at the AP 102. In this embodiment, the UE 100 may itself determine whether or not the indicated amount of buffered data meets a criteria for triggering a service period, such as whether the amount of buffered DL data in the AP 102 is large enough for triggering the service period.

Thereafter, the service period may be triggered by the UE 100 sending a triggering frame to the AP 102. The trigger frame may by a null-frame or data frame, in case there is UL data buffered in the UE 100 to the AP 102. Then, the AP 102 acquires knowledge that the UE 100 is awake and may receive the buffered DL data.

In an embodiment as shown in step 205 of FIG. 5, the AP 102 may transmit and the UE 100 may receive at least part of the DL data satisfying the at least one DL accumulation rule from the AP 102 during the triggered service period. It may be that all of the buffered data is transmitted within the service period or it may be that some of the buffered data is not sent during the triggered SP having a limited duration. In such case, the rest of the buffered data may be transmitted later in another service period.

The proposed power saving technique may use, e.g., a More Data-frame, an end of service period-bit or the TIM information element to improve the power efficiency. These fields, as will be described, may be configurable to increase the traffic transmission efficiency to the UE 100. For instance, if the data accumulation rules are applied to the TIM element, the devices may know upon receiving the element that the accumulation rules of the data are met and there is likely a larger aggregated data block to be received. Further, as one alternative the AP 102 may apply the data accumulation rule for the device 100. This may help in reducing the amount of transmission opportunities (TXOPs) obtained per device 100 by transmitting larger payloads at once.

Let us now look at what the DL accumulation rules are and what they may comprise. In an embodiment, the at least one accumulation rule is access category (AC) specific. The access category may denote a priority level of the enhanced distributed channel access (EDCA) of IEEE 802.11. As shown in FIG. 6, the accumulation request (a.k.a. an accumulation control element) sent from the UE 100 to the AP 102 in step 200 may comprise a plurality of data accumulation rules for different ACs #0, #1, #2 and #3. The request may comprise information of the identity of the requester, e.g. the UE 100, and of the receiver, e.g. the AP 102. The field labeled "length" may indicate the length of the accumulation request-message in octets, for example. The lower row may indicate the length of each field in octets, for example. However, it should be noted that the indicated accumulation rules may not be AC-specific but they may be general and applied similarly to all ACs.

An example of accumulation rules/parameters is shown in FIG. 7. Although the Figure shows that the presented rules are for the AC #0, the presented accumulation rules may as well be for any other AC, or a general set of accumulation rules applicable by each AC. As may be seen, in an embodiment the at least one downlink accumulation rule may indicate at least one of the following: a required minimum transmission unit (MTU) for DL data transmission, a required minimum duration, i.e. accumulation time (AT), for buffering data for DL transmission. Let us look at these closer.

In an embodiment, the accumulation rule indicates the required MTU for DL data transmission from the AP 102 to the UE 100. That is, the AP 102 is not allowed to start transmission to the UE 100 before the AP 102 has enough data in its buffer for generating/aggregating a DL packet having a size which is at least the same as or exceed the required MTU. After the MTU is met by the DL data buffered in the AP 102, the AP 102 may indicate that it has data to be transmitted to the UE 100, for example. The MTU may thus indicate the smallest number of octets that a DL transmission unit must have in units of 50 octets, for example. The value may be set to zero to indicate that the MTU is not to be applied in DL data accumulation. The MTU size may be predetermined and hard-coded to the UE 100.

In an embodiment, the accumulation rule indicates the required minimum AT for buffering data for DL transmission. That is, the AP 102 may not be allowed to start transmission to the UE 100 before the AP 102 has buffered data for at least the required minimum AT. After the AT is met by the AP 102, the AP 102 may indicate that it has some data to be transmitted to the UE 100, for example. In an embodiment, the AT-field indicates the time that the device 100 must buffer the data packets, such as MAC service data units (MSDUs), if the size of the MTU is not reached earlier. The AT may be indicated in units of 200 microseconds, for example. A value of zero may indicate that the AT is not applied. The AT may be predetermined and hard-coded to the UE 100.

Further, in an embodiment, the accumulation rule(s) indicates those DL information element(s) to which the accumulation rule(s) is/are to be applied to by the AP 102. Thus, it may indicate to which information fields and operations the accumulation rule(s) is/are applied to. The information elements may comprise, e.g. at least one of the following: DL data transmission, the TIM, a "More Data"-indicator, an end of service period (EOSP)-indicator. The "accumulation applicability"-field may thus indicate that the accumulation rule(s) is/are to be applied to one of these information elements, to all of these information elements, or to some of these information elements. Thus, it should be noted that, in an embodiment, there may be accumulation rule(s) set per field or operation, i.e. field or operation specific data accumulation rules may be given to the AP 102 by the UE 100.

FIG. 8 shows the "accumulation applicability"-field in more detail. The second row depicts the length of each field in bits, for example. When the accumulation rule(s) is/are applied to the TIM, then the bit corresponding to the field "applied to TIM" may be set to "1", etc. Let us look at these closer.

In an embodiment, the "applied to data transmissions"-field may be set to one to indicate that data may be transmitted from the AP 102 to the UE 100 only when the accumulation rule(s) is/are met. When the accumulation rule(s) is/are not met, the DL data may not be given for transmission to the UE 100. When the data transmission buffer of the AP 102 has traffic that is not yet transmitted, new data may be added to the transmission buffer. When the data transmission buffer is empty when the AP 102 received the accumulation request, the indicted at least one accumulation rule is applied by the AP 102 before the data is given for transmission to the UE 100. It should be noted that the accumulation rule(s) may be terminal specific. That is, even if the AP 102 receives an accumulation request with DL accumulation rule(s) from the UE 100, the AP 102 may still operate with other UEs (from which no accumulation request is received) according to normal transmission mode without following the indicated UE 100-specific rule(s).

In an embodiment, the "applied to TIM" field is set to "1" to indicate that the TIM from the AP 102 to the UE 100 from the AP 102 is set to "1" only when the one or more accumulation rules are met and otherwise the TIM element to the UE 100 is set to "0". When the "applied to TIM" field is set to "0" in the data accumulation request, the AP 102 is allowed to follow the normal operation with respect to TIM indications, i.e., the TIM field corresponding to the UE 100 is set to "1" whenever the AP 102 has any frame to be transmitted to the UE 100.

Therefore, in an embodiment, the UE 100 may receive the TIM from the AP 102, wherein the TIM indicates whether or not there is DL data satisfying the at least one DL accumulation rule in the AP 102 for the UE 100. Upon detecting that there is DL data satisfying the at least one DL accumulation rule in the AP 102, the UE 100 may trigger the service period for receiving the DL data from the AP 102. Thus, the TIM may be acquired from the AP 102 in step 202 of FIG. 2, for example.

In an embodiment, the "applied to More Data"-field is set to "1" to indicate that the "More Data"-field from the AP 102 to the UE 100 is set to "1" only when the one or more accumulation rules are met and otherwise the "More Data"-field of the UE is set to "0". When the "applied to More Data"-field is set to "0", the "More Data"-field from the AP 102 to the UE 100 is set to "1" whenever the AP 102 has any frame to be transmitted to the UE 100. In an embodiment, the "More Data"-field and the TIM-field may both be set to "1" when the AP 102 has buffered traffic for the terminal 100. In an embodiment, the accumulation rule may be applied to the "More Data"-field in case the accumulation rule is applied to all transmitted DL data frames.

Therefore, in an embodiment, the UE 100 may receive a more data-indication from the AP 102, wherein the more data-indication (such as the "More Data"-field) indicates that there is still buffered data in the AP 102 for the UE 100, wherein the buffered data satisfies the at least one DL accumulation rule. Upon detecting that there is still DL data satisfying the at least one DL accumulation rule in the AP 102 for the UE 100, the UE 100 may trigger another service period for receiving the DL data.

In an embodiment, the "applied to EOSP" field is set to "1" to indicate that AP 102 should set the EOSP to "1" for the UE 100 when the AP 102 has no buffered data or has buffered data which does not meet the accumulation rule(s)/condition(s). When the "applied to EOSP" field is set to "0", the AP 102 may apply the EOSP-indication to the UE 100 according to normal procedure. For instance, when the "applied to EOSP" field is set to "1", the AP 102 receives a trigger frame from the UE 100 and the AP 102 has buffered traffic that does not meet the indicated accumulation rule(s), the AP 102 may send a QoS-Null frame with the EOSP-bit set to "1" to terminate the service period without transmitting the buffered data. The accumulation rule(s) may be applied to the EOSP-bit to avoid frequent service period triggering. The UE 100 may verify that the buffered DL data in the AP 102 meets the accumulation rule(s) by receiving the TIM indication.

In this manner, the UE 100 may receive the EOSP-indication from the AP 102, wherein the EOSP-indication indicates that there is no DL data satisfying the at least one DL accumulation rule buffered in the AP 102 (even though there may be some DL data for the UE 100 in the AP 102). This may be advantageous so that the UE 100 may enter a sleep mode in order to save power. It should be noted that the frames that carries the TIM, the More Data-field or the EOSP-indication are not considered as part of the buffered traffic.

Further, as shown in FIG. 8, in an embodiment, the accumulation rule(s) may indicate the maximum size of DL data packets to which the at least one DL accumulation rule is not applied to by the AP 102. That is, there may be a predetermined limit and each DL data packet, such as a MSDU, which is smaller than the limit, may be sent immediately without applying the indicated accumulation rule(s). Such maximum size of excluded MSDU may thus indicate the size of the data packets, such as MSDUs, in units of 5 octets to which the accumulation rule is not applied to. This may be advantageous because the maximum size of excluded DL data packets-parameter may provide faster delivery of small frames, such as ACKs or to HTTP GET-frames, which may improve the delay performance of the communication.

Figure 9:
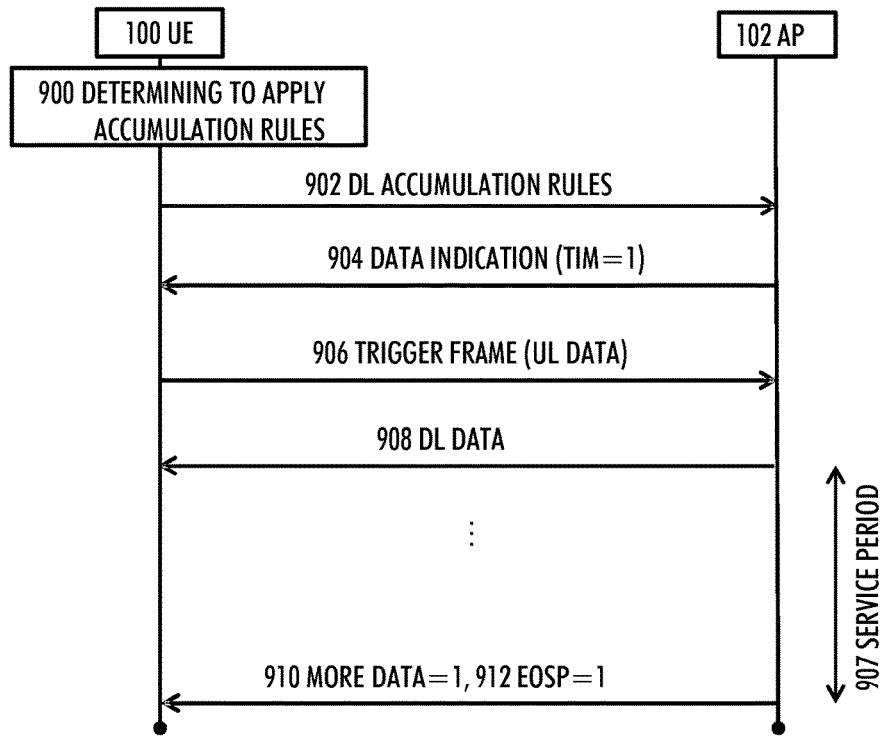
FIGS. 9 and 10 illustrate signaling flow diagrams, according to some embodiments.

Let us look at the proposal in the form of a signal flow diagram shown in FIG. 9. In step 900, the UE 100 may decide to apply the accumulation request and accumulation rules. In step 902, the UE 100 may transmit the DL data accumulation request with the accumulation rules to the AP 102. Let us assume that the AP 102 accepts to take the indicated one or more accumulation rules into usage. Then, in step 904, the AP 102 may transmit a data indication, such as the "TIM=1" in the beacon or TIM frame, to the UE 100, in order to let the UE 100 know that there is buffered data, which meets the indicated accumulation rules, in the AP 102. When the accumulation rules are applied to the TIM field indications, the terminal 100 knows that depending on used accumulation parameter/rule values, the DL data has had better opportunities for aggregation, or that at least some amount of buffered data exists in the AP 102. This may help the terminal 100 to select the time when to trigger a service period to obtain the buffered data from the AP 102, or if indications from multiple links corresponding to multiple APs are received, which link to trigger.

Based on the received message and the detection that there is, e.g., enough buffered data in the AP 102, the UE 100 may send a trigger frame (null frame or data frame) and possibly some more UL data in step 906 to the AP 102. The service period 907 may be triggered by the AP 102 receiving the trigger frame in step 906. The AP 102 then knows that the UE 100 is awake and able to receive DL data in step 908. As shown, the AP 102 may send "More Data=1"-bit in step 910 to indicate that there is still some data fulfilling the DL data accumulation rule(s) in the AP 102. From this, the UE 100 may know that it should not go to sleep but send another trigger frame to trigger another service period for receiving the rest of the DL data. Alternatively, the AP 102 may send the "EOSP=1"-indication in step 912 indicating that there is no more data satisfying the indicated accumulation conditions left in the buffer of the AP 102.

Figure 10:
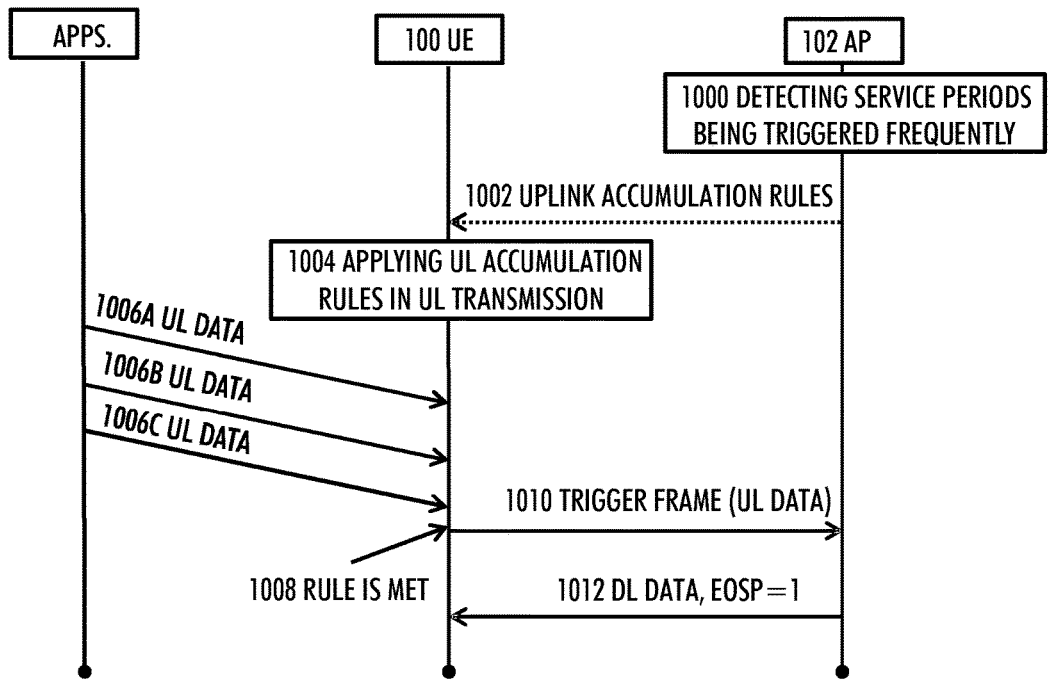

FIG. 10 shows a signaling flow diagram according to some embodiments relating UL data transmission to the AP 102. Let us assume that as the terminal 100 operates in power save mode, it may get UL traffic that it should transmit to the AP 102. If the terminal 100 transmits every single UL packet during a separate service period, the number of service periods gets easily very high. Also the amount or size of packets that are transmitted during a service period may be low, resulting to high overheads in the data transmission and high power consumption, because the sleep duration of the terminal 100 is not optimized. In step 1000, the AP 102 may detect that the specific UE 100 triggers service periods too often. The AP 102 may detect, e.g., that UL data transmission during a service period does not meet a predetermined criterion. The AP 102 may, for example, detect that the UE 100 is transmitting a lot of small frames in multiple transmission opportunities (TXOPs), that is, the size of the transmitted UL frames is less than the predetermined criterion. This may cause the UE 100 to trigger TXOPs too often.

Therefore, in step 1002, the AP 102 may transmit information to the specific user terminal 100, wherein the information indicates at least one UL accumulation rule to be applied by the UE 100 for the transmission of UL data in order to decrease the frequency of triggering the service periods. Such accumulation indication frame as the information may configure the UL data transmission parameters of the frequent transmitter (the UE 100). The UL accumulation rule(s) may comprise at least one of the following: a required MTU for UL data transmission, a required minimum AT for buffering data for UL transmission. These UL accumulation rules may be used in a similar manner as the corresponding DL accumulation rules. The AP 102 may transmit the accumulation indication frame to a broadcast address, or include the UL accumulation parameters to the beacon frame. In this case the accumulation rules of all associated terminals may be changed. This may advantageously reduce the amount of obtained TXOPs and improve the channel utilization and power saving.

In step 1004, the UE 100 may apply at least one UL accumulation rule in transmission of UL data to the AP 102. It should be noted that even though steps 1000 and 1002 are shown in FIG. 10, in an embodiment, the UE 100 itself decides to apply the UL accumulation rules and the UE 100 may itself determine such UL accumulation rules. In this embodiment, the steps 1000 and 1002 may be omitted. The uplink accumulation rule(s) for service period initiation may, thus, be device's 100 own internal MIB value that need not to be communicated to the AP 102. The MIB is management information base and it may contain the configurable parameters of the UE 100. The MIB value may be freely set and default value may be access category specific. For AC#0 and AC#1 the default values may be "MTU=50" and "AT=5", for AC#2 and AC#3 the values may be "0" and "0", respectively, for example.

As the UL accumulation rule(s) are taken into use, the UE 100 may transmit the UL data to the AP 102 upon detecting that the at least one UL accumulation rule is met in step 1008. In order to meet the at least one UL accumulation rule, such as the required MTU of the UL data packet, the UE 100 may have needed to buffer many UL frames 1006A, 1006B, and 1006C. The frames 1006A, 1006B, and 1006C may have been obtained from the same application or from different applications of the UE 100, for example. After receiving the frames 1006A, 1006B, and 1006C, the UE 100 may generate one aggregated packet which meets the MTU requirement for the UL transmission. Thereafter, the UE 100 may send the trigger frame and the aggregated UL data packet, in step 1010. The AP 102 may respond by transmitting DL data or a null-frame with "EOSP=1", as the case may be, in step 1012. As a result, when the data accumulation rules for uplink data are applied, the device 100 may advantageously initiate service periods more seldom and the power consumption of the data transmission is reduced.

In an embodiment, as shown in step 1100 of FIG. 11, the sent accumulation request comprises multiple sets of at least one DL accumulation rule, wherein each set corresponds to a specific level of DL accumulation rules. The DL accumulation rules may thus be set to establish multi-level DL accumulation rules. When DL accumulation rules are set to multiple levels, the AP 102 may indicate in step 1102 to the UE 100 which DL accumulation rule levels are met, i.e. indicate those levels for which the corresponding set of at least one DL accumulation rule is met by the downlink data in the access node. The indication may, for example, comprise multiple association identifier (AID) fields, each field corresponding to one level of DL accumulation rules. The AP 102 may then be triggered to deliver the DL traffic only if the minimum accumulation level for the DL traffic is met. Multiple DL accumulation rule set levels may help the UE 100 to make more precise decision when it should trigger service period with the AP 102, for example. The setup signaling may setup multiple accumulation rules.

As said, when multiple accumulation levels are present, the AP 102 may signal the AID values to indicate presence of the traffic on different accumulation levels. The wireless network terminal 100 may always have one AID value that is obtained in the association process. The TIM element in the index of the AID value that is given in association is set to "1" to indicate buffered data in the AP 102. E.g., TIM [AID] may be set to "1" to indicate buffered traffic for the UE 100. Parallel to the AID value assigned in the association, the UE 100 may setup rules to use other AID values. For instance, the UE 100 may use accumulation rule(s) to allocate other AID values into use. The other AID values may indicate the amount of buffered data, for example. The AP 102 may assign multiple AID values, one per each accumulation rule level. E.g., for each accumulation rule, the AP 102 may assign an AID element. When a specific rule is met, the assigned AID element is set to value "1" and indicated to the UE 100.

If the AP 102 supports the use of multiple accumulation levels, it may indicate to the UE 100 the number of supported accumulation levels in association signaling, or it may support a predefined amount of the accumulation levels.

In an embodiment, the accumulation rule(s) may be established stream specifically. In the stream specific setup, the add traffic stream request (ADDTS.request) and ADDTS.response signaling may include the at least one accumulation rules for the traffic that belongs to the stream. The Traffic classification (TCLAS) element may specify the traffic addressing rule by using source/destination internet protocol (IP) addresses or medium access control (MAC) addresses and the TSPEC may specify the characteristics and the desired transmission quality for the traffic. When accumulation rules are set for a traffic stream, the AP 102 may assign AID values from beacon to indicate the UE 100 that one or more stream specific accumulation levels are met.

In an embodiment, the admission control requires the at least one accumulation rule to be met before triggering the DL data transmission. In case of multiple sets of accumulation rules, the admission control may require that the minimum level of the accumulation rule is applied for the stream. The minimum accumulation level may be specified per access category. The minimum accumulation requirement may be applied as a part of the admission control so that the data transmissions must fulfill the minimum accumulation rules.

In an embodiment, one UE 100 may apply multipath communication to connect to multiple APs 102, 108, as shown in FIG. 12A. In such case, it may be advantageous for the UE 100 to know which AP among the plurality of APs 102, 108 operates more efficiently, for example. In an embodiment, as shown in FIG. 12B, the UE 100 may in step 1200 receive messages from multiple APs 102, 108, wherein each message indicates whether the buffered downlink data in the corresponding AP 102, 108 for the US 100 satisfies the at least one downlink accumulation rule. In step 1202, the UE 100 may select a communication link to be triggered among the multiple communication links to multiple AP 102, 108 on the basis of the received messages. When the device 100 operates with multiple data links, e.g., uses multipath protocols, the amount of buffered data may help the UE 100 to select the link with most data, which may increase throughput and lower the power consumption. It should be noted, that in an embodiment, the AP 102 indicates the amount of data buffered in the AP 102 for the UE 100. In any case, the UE 100 may acquire (from the APs 102, 108 accepting the usage of the accumulation rules) an indication indicating whether or not the corresponding AP 102, 108 has DL data fulfilling the indicated accumulation rule(s) in its buffer (e.g. does the data buffer comprise large enough DL data packets). As a result, the UE 100 may select the link to be triggered next more wisely based on the TIM indications.

Figure 13:
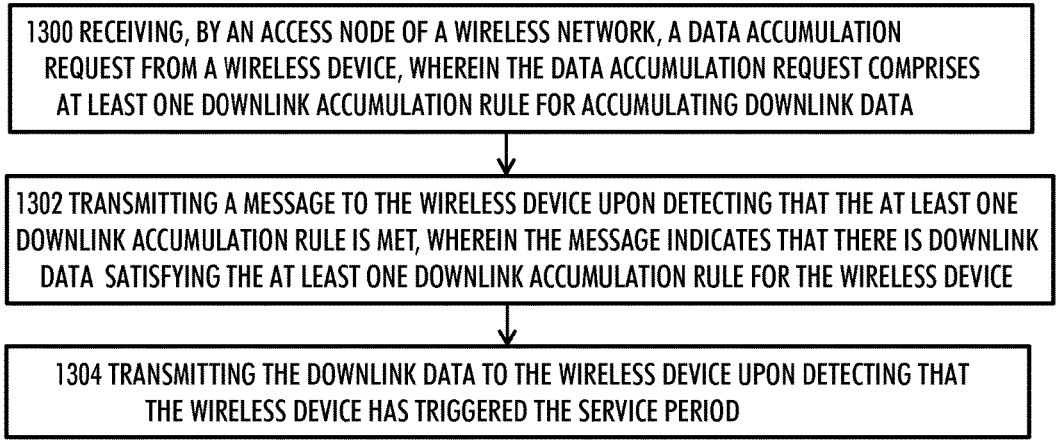

Looking from the AP 102 point of view, an embodiment may comprise, as shown in FIG. 13, receiving, by an AP 102 in step 1300, a data accumulation request from the UE 100, wherein the data accumulation request comprises at least one DL accumulation rule for accumulating DL data. In step 1302, the AP 102 may transmit a message to the UE 100 upon detecting that the at least one DL accumulation rule is met, wherein the message indicates that there is DL data satisfying the at least one DL accumulation rule for the UE 100. This may be done in order to allow the UE 100 to trigger a service period for receiving the DL data. Thereafter, in step 1304, the AP 102 may transmit the DL data to the UE 100 upon detecting that the UE 100 has triggered the service period.

Figure 14:
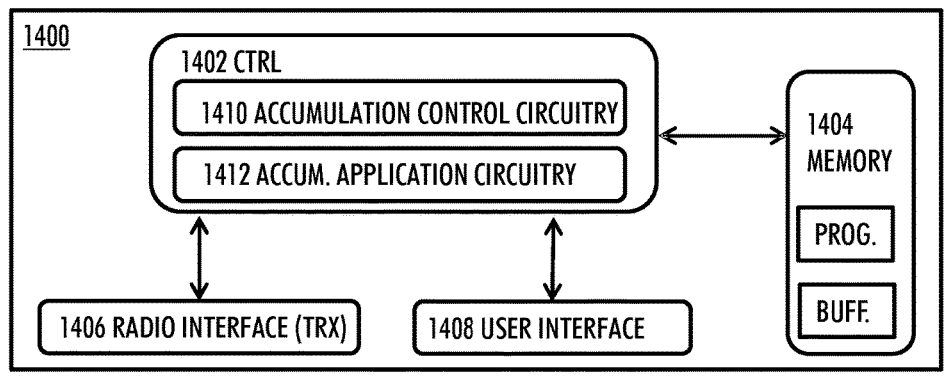
FIGS. 14 and 15 depict apparatuses, according to some embodiments.
Figure 15:
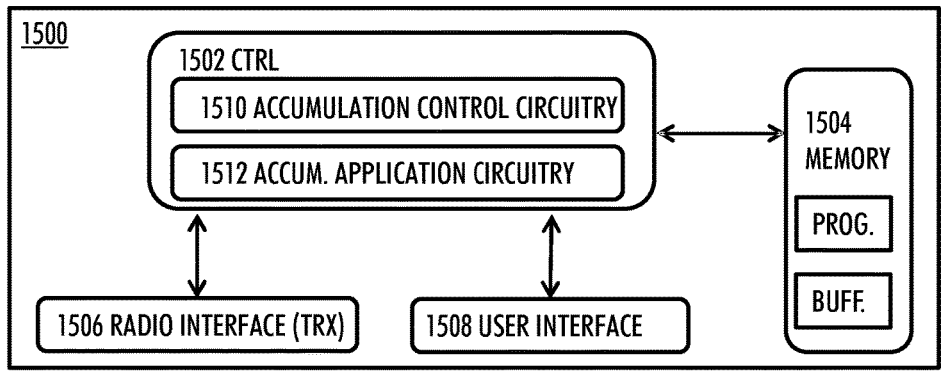

FIGS. 14 to 15 provide apparatuses 1400, 1500 comprising a control circuitry (CTRL) 1402, 1502, such as at least one processor, and at least one memory 1404, 1504 including a computer pro-gram code (PROG), wherein the at least one memory and the computer pro-gram code (PROG), are configured, with the at least one processor, to cause the respective apparatus 1400, 1500 to carry out any one of the embodiments described. The memory 1404, 1504 may be implemented using any suitable data storage technology, such as semiconductor based memory devices, flash memory, magnetic memory devices and systems, optical memory devices and systems, fixed memory and removable memory. The memories 1404, 1504 may comprise data buffers for buffering UL or DL data, respectively.

The apparatuses 1400, 1500 may further comprise communication interfaces (TRX) 1406, 1506 comprising hardware and/or software for realizing communication connectivity according to one or more communication protocols. The TRX 1406, 1506 may provide the apparatus with communication capabilities to access the radio access network, for example.

The apparatuses 1400, 1500 may also comprise user interfaces 1408, 1508 comprising, for example, at least one keypad, a microphone, a touch display, a display, a speaker, etc. Each user interface may be used to control the respective apparatus by the user.

In an embodiment, the apparatus 1400 may comprise the terminal device of a wireless network system, e.g. a user equipment (UE), a user terminal (UT), a computer (PC), a laptop, a tabloid computer, a cellular phone, a mobile phone, a communicator, a smart phone, a palm computer, or any other communication apparatus. Alternatively, the apparatus 1400 is comprised in such a terminal device. Further, the apparatus 1400 may be or comprise a module (to be attached to the apparatus) providing connectivity, such as a plug-in unit, an "USB dongle", or any other kind of unit. The unit may be installed either inside the apparatus or attached to the apparatus with a connector or even wirelessly. In an embodiment, the apparatus 1400 may be, comprise or be comprised in a wireless device, such as the UE/STA 100.

The control circuitry 1402 may comprise an accumulation control circuitry 1410 for controlling the usage of the data accumulation, determining the at least one accumulation rule, and for causing the negotiation between the UE 100 and the AP 102 to take place. The control circuitry 1402 may further comprise an accumulation application circuitry 1412 for applying the data accumulation in UL data transmissions, for example, according to any of the embodiments.

In an embodiment, the apparatus 1500 may be or be comprised in a base station or access node/point of a wireless network, such as WLAN. In an embodiment, the apparatus 1500 is or is comprised in the access node/point 102.

The control circuitry 1502 may comprise an accumulation control circuitry 1510 for controlling the usage of the data accumulation, for receiving the at least one accumulation rule from the UE 100, for causing the negotiation between the UE 100 and the AP 102 to take place, and for deciding whether the data accumulation is accepted or not, for example. The control circuitry 1502 may further comprise an accumulation application circuitry 1512 for applying the data accumulation in DL data transmissions, for example, according to any of the embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method, comprising:
   transmitting, by a wireless device, a data accumulation request to an access node of a wireless network, wherein the data accumulation request comprises at least one downlink accumulation rule for accumulating downlink data, and the at least one downlink accumulation rule comprises at least one parameter of the following parameters: a minimum transmission unit for downlink data transmission and a minimum duration for buffering data for downlink data transmission;

receiving a message from the access node, wherein the message comprises a traffic indication map which indicates whether there is downlink data satisfying the at least one downlink accumulation rule in the access node for the wireless device; and upon detecting that there is downlink data satisfying the at least one downlink accumulation rule in the access node, triggering a service period for receiving the downlink data from the access node.

2. The method of claim 1, further comprising:
receiving a data accumulation response from the access node, wherein the response indicates whether or not the access node accepts the data accumulation request.

3. The method of claim 1, wherein the data accumulation request indicates that the access node is allowed to transmit the message when downlink data buffered in the access node for the wireless device satisfies the at least one downlink accumulation rule.

4. The method of claim 1, wherein the wireless network is a wireless local area network.

5. A method, comprising:
receiving, by an access node of a wireless network, a data accumulation request from a wireless device, wherein the data accumulation request comprises at least one downlink accumulation rule for accumulating downlink data, and the at least one downlink accumulation rule comprises at least one parameter of the following parameters: a minimum transmission unit for downlink data transmission and a minimum duration for buffering data for downlink data transmission;

transmitting a message to the wireless device upon determining that the at least one downlink accumulation rule is met, wherein the message comprises a traffic indication map which indicates whether there is downlink data satisfying the at least one downlink accumulation rule in the access node for the wireless device in order to allow the wireless device to detect that there is downlink data satisfying the at least one downlink accumulation rule in the access node and trigger a service period for receiving the downlink data; and transmitting the downlink data to the wireless device upon detecting that the wireless device has triggered the service period.

6. The method of claim 5, further comprising:
transmitting a data accumulation response to the wireless device wherein the response indicates whether the data accumulation request is accepted or not.

7. The method of claim 5, wherein an admission control requires the at least one downlink accumulation rule to be met before triggering the transmitting of the downlink data.

8. The method of claim 5, further comprising:
detecting that a specific user terminal triggers service periods, wherein uplink data transmission during the service periods does not meet a predetermined criterion; and
transmitting information to the specific user terminal, wherein the information indicates at least one uplink accumulation rule to be applied by the wireless device for transmission of uplink data in order to decrease a frequency of triggering the service periods.

9. An apparatus, comprising:
at least one processor and at least one non-transitory memory including a computer program code, wherein the at least one memory and the computer program code are configured, with the at least one processor, to cause the apparatus at least to:
cause a wireless device of a wireless network to transmit a data accumulation request to an access node of the wireless network, wherein the data accumulation request comprises at least one downlink accumulation rule for accumulating downlink data, and the at least one downlink accumulation rule comprises at least one parameter of the following parameters: a minimum transmission unit for downlink data transmission and a minimum duration for buffering data for downlink data transmission;
cause the wireless device to receive a message from the access node, wherein the message comprises a traffic indication map which indicates whether there is downlink data satisfying the at least one downlink accumulation rule in the access node for the wireless device; and
upon detecting that there is downlink data satisfying the at least one downlink accumulation rule in the access node, trigger a service period for receiving the downlink data from the access node upon determining.

10. The apparatus of claim 9, wherein the at least one memory and the computer program code are configured, with the at least one processor, to cause the apparatus further to:
cause the wireless device to receive a data accumulation response from the access node, wherein the response indicates whether or not the access node accepts the data accumulation request.

11. The apparatus of claim 9, wherein the data accumulation request indicates that the access node is allowed to transmit the message when downlink data buffered in the access node for the wireless device satisfies the at least one downlink accumulation rule.

12. The apparatus of claim 9, wherein the wireless network is a wireless local area network.

13. An apparatus, comprising:
at least one processor and at least one non-transitory memory including a computer program code, wherein the at least one memory and the computer program code are configured, with the at least one processor, to cause the apparatus at least to:
cause an access node of a wireless network to receive a data accumulation request from a wireless device of the wireless network, wherein the data accumulation request comprises at least one downlink accumulation rule for accumulating downlink data, and the at least one downlink accumulation rule comprises at least one parameter of the following parameters: a minimum transmission unit for downlink data transmission and a minimum duration for buffering data for downlink data transmission;
cause the access node to transmit a message to the wireless device upon determining that the at least one downlink accumulation rule is met, wherein the message comprises a traffic indication map which indicates whether there is downlink data satisfying the at least one downlink accumulation rule in the access node for the wireless device in order to allow the wireless device to detect that there is downlink data satisfying the at least one downlink accumulation rule in the access node and trigger a service period for receiving the downlink data; and cause the access node to transmit the downlink data to the wireless device upon detecting that the wireless device has triggered the service period.

14. The apparatus of claim 13, wherein the at least one memory and the computer program code are configured, with the at least one processor, to cause the apparatus further to:

cause the access node to transmit a data accumulation response to the wireless device wherein the response indicates whether the data accumulation request is accepted or not.

15. The apparatus of claim 13, wherein an admission control requires the at least one downlink accumulation rule to be met before causing the access node to transmit the downlink data.

16. The apparatus of claim 13, wherein the at least one memory and the computer program code are configured, with the at least one processor, to cause the apparatus further to:

detect that a specific user terminal triggers service periods, wherein uplink data transmission during the service periods does not meet a predetermined criterion; and cause the access node to transmit information to the specific user terminal, wherein the information indicates at least one uplink accumulation rule to be applied by the wireless device for transmission of uplink data in order to decrease a frequency of triggering the service periods.

* * * * *